Jan. 25, 1927. 1,615,304
J. H. KORNER ET AL
FRUIT PEELING MACHINE
Filed April 30, 1924
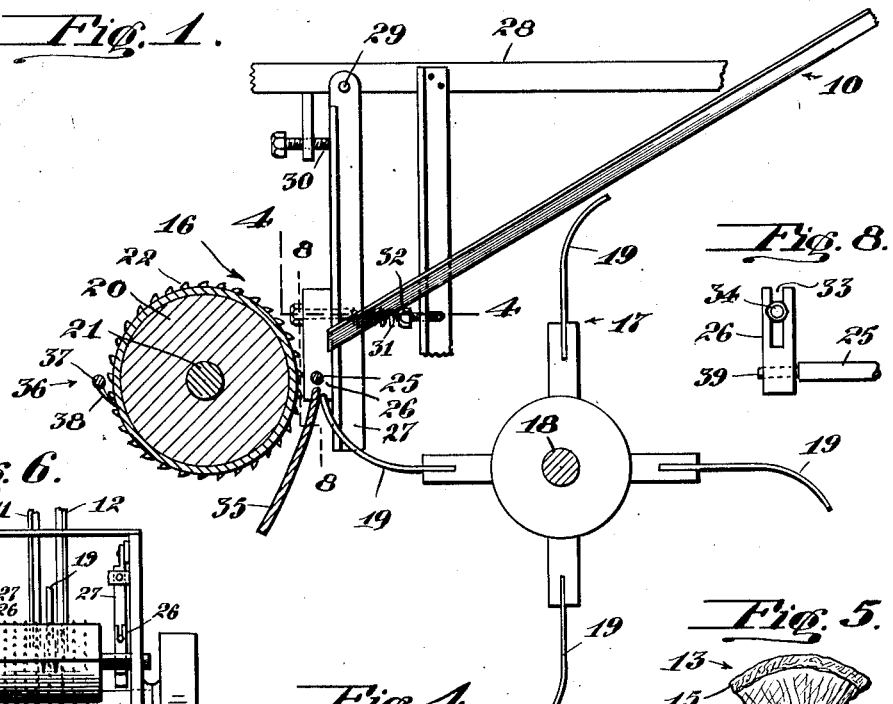
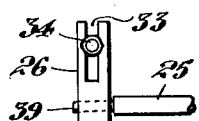
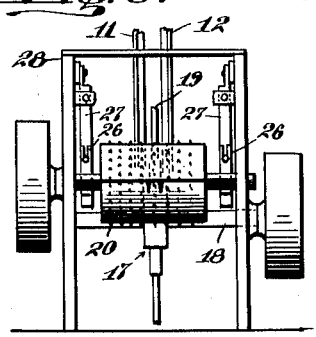
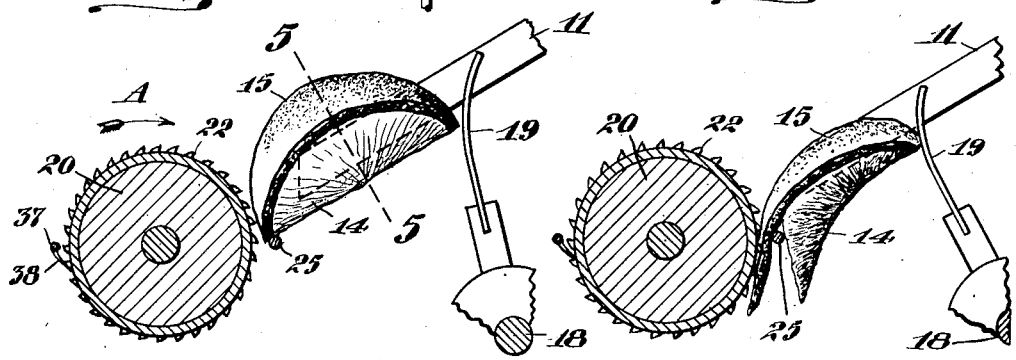
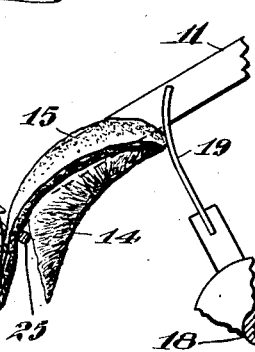
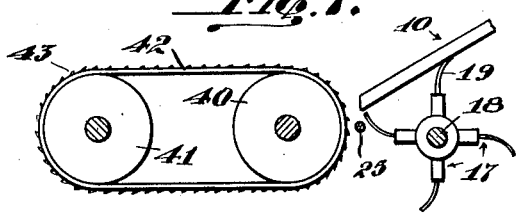
Inventors;
John H. Korner,
Forrest G. Stanford;
By R. S. Berry
Attorney.

Patented Jan. 25, 1927.

1,615,304

UNITED STATES PATENT OFFICE.

JOHN H. KORNER AND FORREST G. STANFORD, OF LOS ANGELES, CALIFORNIA; SAID STANFORD ASSIGNOR, BY MESNE ASSIGNMENTS, TO THE HYLAND STANFORD COMPANY, INC., OF TOLEDO, OHIO, A CORPORATION OF OHIO.

FRUIT-PEELING MACHINE.

Application filed April 30, 1924. Serial No. 709,985.

This invention particularly pertains to a mechanism for separating the pulp from the rind or peel of thick-skinned fruits, such as oranges, lemons, grape-fruit and the like, and which is especially applicable for use in removing the pulp from the rind of citrus fruits preparatory to the production of fruit juice.

An object of the invention is to provide a mechanism of the above character which is capable of effecting such thorough separation of the pulp from the rind as to enable the recovery of a maximum of the fruit juice, and which is adapted to be operated at high speed so that a large quantity of fruit may be peeled in a short time.

Another object is to provide a fruit peeling mechanism which is capable of being operated continuously and which embodies instrumentalities whereby the fruit may be fed and peeled automatically.

Another object is to provide a mechanism whereby the pulp and rind may be so separated that the pulp may be treated to recover the fruit juice, or otherwise, and the rind treated to form fruit-peel products, thus enabling the utilization of both the pulp and rind in the preparation of fruit products.

A further object is to provide a fruit peeling mechanism which is adapted to be adjusted to accommodate it to the treatment of fruits of various rind thickness.

With the foregoing objects in view, together with such other objects and advantages as may subsequently appear, our invention resides in the parts, and in the construction, combination and arrangement of parts as hereinafter described and claimed, and illustrated by way of example in the accompanying drawings, in which—

Figure 1 is a detail view in vertical section and side elevation, showing the fruit feeding and peeling elements employed in carrying out the invention.

Figures 2 and 3 are details in section illustrating the manner of effecting the separation of the pulp and rind of the fruit.

Figure 4 is a detail in horizontal section as seen on the line 4—4 of Figure 1.

Figure 5 is a detail in section as seen on the line 5—5 of Figure 2.

Figure 6 is an end view of the machine.

Figure 7 is a detail illustrating a modified form of the invention.

Figure 8 is a detail as seen on the line 8—8 of Figure 1 illustrating a modified form of the pulp and rind separating element.

In carrying out the invention the fruit to be peeled is first cut into segments, preferably being divided into quarter sections, which sections are fed in any suitable manner to a chute 10 comprising a pair of spaced, parallel, laterally inclined side members or rails 11 and 12, as particularly shown in Figure 5; the fruit segment 13 being first delivered to the chute and carried by the latter with the pulp portion 14 of the fruit seating in the chute, and with the rind 15 extending uppermost. The chute 10 is preferably inclined so that the fruit segments may be fed by gravity, which, however, is not essential, as any means of conveying the fruit along the chute may be employed, as occasion may require. Means are provided for discharging the fruit segments, one at a time, from the discharge end of the chute to feed them singly to a peeling device 16, which means is here shown as comprising a series of radiating arms 17 carried on a rotary shaft 18 and which arms preferably embody curved, yieldable or resilient outer end portions 19 formed of plate springs. These yieldable arms are so positioned that when the shaft 18 is rotated the arms will pass between the rails 11 and 12 of the chute 10 and advance rearwardly of a fruit segment to engage the latter and advance it to the discharge end of the chute.

The peeling device 16 located at the discharge end of the chute embodies an impeller element shown in Figures 1, 2, 3, and 6 as comprising a roller 20 mounted on a shaft 21 the periphery of which roller is studded with short teeth or spurs 22, or is otherwise formed to render it of such rough character as to effect a positive engagement with the fruit rind fed thereto.

Interposed between the periphery of the roller 20 and the end of the chute 10 is a stripping or peeling element which is shown in Figures 1 and 4 as comprising a bar or blade 25 which is preferably circular in cross section, and may in some instances be fixed against rotation, and in other cases may be revolubly mounted as occasion may require. The stripper bar 25 is here shown as supported at its ends on blocks 26 adjustable vertically on dependent hangers 27 pivoted at their upper ends to a suitable frame 28 as indicated at 29 to swing toward or away from the roller 20. The forward movement of the hanger 27 is limited by adjustable stops 30, and the rearward movement of the hangers is yieldably opposed by springs 31 which bear between the hangers and adjustable abutments 32, which abutments are formed of screws that are adapted to be adjusted to vary the tension of the springs 31. The blocks 26 are mounted for vertical adjustment on the hangers 27 so as to enable the positioning of the bar 25 on various horizontal planes relative to the feed roller 20; the blocks 26 being formed with vertical slots 33 through which extend bolts 34 carried by the hangers 27 and adapted to clamp the blocks against movement on the hangers in any desired position.

The stripper bar 25 extends parallel with the axis of the impeller roller 20 on a plane below the lower or discharge end of the feed chute and is spaced a short distance from the periphery of the impeller roller; the horizontal plane of the stripper bar being adjusted as occasion may require by shifting the blocks 26 vertically on the hangers 27, and the normal spaced relation of the stripper bar to the impeller roller being regulated by adjusting the stops 30.

In the operation of the invention, the fruit to be worked is cut into sections in any suitable manner being preferably cut in quarters, and is delivered to the chute 10 and caused to advance along the latter with the successive fruit sections disposed in spaced relation. The shaft 18 is rotated continuously and at such speed as to cause the yieldable outer end portions 19 of the arms 17 to successively engage the rear portions of the fruit sections and thereby cause each fruit section to be advanced and fed from the discharge end of the chute where it is brought into endwise contact with the periphery of the impeller roller under the resilient pressure of a resilient arm member 19. The fruit section, when thus moved to a position against the impeller roller will pass over the stripper bar 25, as shown in Figure 2; the stripper bar being so spaced in relation to the surface of the impeller roller that when the fruit section passes thereover and abuts against the studded surface of the roller, the inner portion of the rind at the forward end of the fruit section will be disposed substantially on a vertical plane with the side of the stripper bar facing the roller. The impeller roller is rotated continuously in the direction indicated by the arrow A in Figure 2, so that the studs or projections thereon will engage the outer surface of the rind of the fruit section and act to pull the rind downwardly and draw it through the space between the impeller roller and the stripper bar. In this manner the stripper bar will be caused to be interposed between the pulp and the rind and will effect separation of the pulp and rind as the latter is advanced by the impeller; the rind passing to one side of the stripper bar and the pulp passing to the other, as shown in Figure 3. The resilient portions 19 of the arms 17 exert a yieldable pressure on the fruit section and thereby assist the impeller roller in advancing the fruit section and subjecting it to the stripping or peeling action of the stripper bar. The end portions 19 of the arm 17 in moving downward past the stripper bar 25, act to pinch the separated pulp and prevent the pulp from being pulled by the advancing rind over the stripper bar where the resistance to the separation of the rind and pulp at the rear end of the advancing fruit section is excessive. The portions 19 being resilient, permits the operation on fruit sections of different lengths and also compensates for any slight variation in the peripheral speed of the impeller roller in relation to the travel of the arms 17. The rind and pulp will thus be effectively separated from each other.

The stripper bar 25 being carried on the spring pressed swinging arms 27, may move outwardly or away from the impeller bar to vary the space between the stripper bar and the roller according to variations in thickness of the rind. A partition 35 may be disposed beneath the stripper bar as shown in Figure 1 to direct the rind and pulp into separate containers.

As a means for preventing the rind from being carried along the impeller roller, an ejector 36 is provided which is here shown as comprising a stationary rod 37 carrying teeth 38 which slidably contact with the surface of the roller between the projections 22 thereon in such manner as to effect removal of any rind that may cling to the roller and be carried forward to the ejector.

In some instances it may be desirable to construct the stripper bar 25 so that it may rotate, in which event, the ends of the stripper bar may be formed with trunnions 39, as shown in Figure 8, the trunnions being rotatably supported in the blocks 26.

In the modified form of the invention shown in Figure 7, the impeller embodies a pair of spaced rollers 40 and 41 around which passes a belt 42 having studs 43 on its outer surface; the belt being driven by rotating either of the rollers 40 or 41 in such manner that the studded surface of the belt will engage the rind of the fruit and feed the fruit section astride the stripper bar in the manner like that before described with reference to the studded roller 20.

We claim—

1. In a fruit peeling mechanism, a dividing element adapted to be interposed between the rind and pulp of a fruit section to be peeled, an impeller having a surface contiguous to said element adapted to engage the fruit rind and advance it between said impeller and dividing element whereby the rind will be peeled from the pulp of the fruit section, and yieldable means operable to push the fruit sections and aid the impeller in effecting advance of the fruit sections.

2. In a fruit peeling mechanism, a stripper member, means for pulling a section of fruit astride said member, whereby the rind of the fruit will be caused to pass to one side of said member, and the pulp of the fruit passed to the other side thereof, and yieldable means for advancing a fruit section to said last named means.

3. In a fruit peeling mechanism, a chute adapted to convey fruit sections, yieldable means for advancing the fruit sections thereon, a stripper bar located at the discharge end of said chute over which the fruit section may pass, and means for forcing the fruit section astride said bar whereby the rind will be caused to pass to one side of the bar and the pulp passed to the other side thereof.

4. In a fruit peeling mechanism, an inclined chute adapted to convey fruit sections, means for advancing fruit sections on said chute, a roller located adjacent the lower end of said chute, and a stripper bar disposed between said roller and the contiguous end of the chute on which the fruit sections may pass.

5. In a fruit peeling mechanism, an inclined chute adapted to convey fruit sections, means for advancing fruit sections on said chute, a roller located adjacent the lower end of said chute, and a stripper bar disposed between said roller and the contiguous end of the chute on which the fruit sections may pass, said roller being adapted to engage the rind of the fruit section and to draw it between the roller and bar whereby the rind may be separated from the pulp.

6. In a fruit peeling mechanism, an inclined chute adapted to convey fruit sections, means for advancing fruit sections on said chute, a roller located adjacent the lower end of said chute, and a stripper bar disposed between said roller and the contiguous end of the chute on which the fruit sections may pass, said roller being adapted to engage the rind of the fruit section and to draw it between the roller and bar whereby the rind may be separated from the pulp, said means for advancing the fruit sections embodying spring members adapted to exert a yieldable pressure on the fruit sections as they are advanced by the roller.

7. In a fruit peeling mechanism, a chute adapted to convey fruit sections, a roller located adjacent the lower end of said chute, a horizontally movable stripper bar disposed between said roller and the contiguous end of the chute, and means for yieldably opposing movement of the stripper bar away from said roller.

8. In a fruit peeling mechanism, a chute adapted to convey fruit sections, a roller located adjacent the discharge end of said chute, a stripper bar disposed between said roller and the contiguous end of the chute, said roller being adapted to engage the rind of the fruit sections and to draw it between the roller and stripper bar, whereby the rind may be caused to pass to one side of the stripper bar and the pulp to the other, and means operable to exert a yieldable pressure on the fruit sections as they are advanced by the roller and adapted to engage the pulp and advance it past said stripper bar on the side thereof opposite that to which the rind is passed.

JOHN H. KORNER.
FORREST G. STANFORD.